(12) United States Patent
Zewail et al.

(10) Patent No.: US 11,700,599 B2
(45) Date of Patent: Jul. 11, 2023

(54) BEAM SWITCHING GAP

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Tao Luo, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 17/066,950

(22) Filed: Oct. 9, 2020

(65) Prior Publication Data

US 2021/0112540 A1 Apr. 15, 2021

Related U.S. Application Data

(60) Provisional application No. 62/913,473, filed on Oct. 10, 2019.

(51) Int. Cl.
*H04W 72/044* (2023.01)
*H04W 72/23* (2023.01)

(52) U.S. Cl.
CPC ......... *H04W 72/046* (2013.01); *H04W 72/23* (2023.01)

(58) Field of Classification Search
CPC . H04W 72/046; H04W 72/042; H04W 72/14; H04W 72/23
See application file for complete search history.

(56) References Cited

U.S. PATENT DOCUMENTS

| | | | |
|---|---|---|---|
| 2017/0359826 A1* | 12/2017 | Islam | H04W 72/14 |
| 2019/0082330 A1 | 3/2019 | Guey et al. | |
| 2019/0349915 A1* | 11/2019 | Ahn | H04L 5/0091 |
| 2020/0119839 A1* | 4/2020 | Jo | H04L 5/00 |
| 2021/0242926 A1* | 8/2021 | Yang | H04W 24/10 |
| 2022/0190989 A1* | 6/2022 | Tiirola | H04L 5/0094 |

OTHER PUBLICATIONS

International Search Report and Written Opinion—PCT/US2020/055165—ISA/EPO—dated Dec. 1, 2020.

(Continued)

*Primary Examiner* — Jeffrey M Rutkowski
*Assistant Examiner* — Jasper Kwoh
(74) *Attorney, Agent, or Firm* — Qualcomm Incorporated

(57) ABSTRACT

Certain aspects of the present disclosure provide techniques for beam switching gaps. A base station (BS) can send an allocation to a user equipment (UE) including an at least one symbol beam switching gap based, at least in part, on a subcarrier spacing (SCS) of the UE. The UE and BS can then communicate using the allocation. The allocation may also be based on reported capability of the UE. The allocation may also be based on capability of the BS. The beam switching gap can be allocated explicitly or implicitly.

39 Claims, 11 Drawing Sheets

400

405

RECEIVE AN ALLOCATION FROM A BASE STATION (BS) INCLUDING AN AT LEAST ONE SYMBOL BEAM SWITCHING GAP BASED, AT LEAST IN PART, ON A SUBCARRIER SPACING (SCS) OF THE UE

410

COMMUNICATE WITH THE BS USING THE ALLOCATION

(56) References Cited

OTHER PUBLICATIONS

Qualcomm Incorporated: "Control Channel Multi-Beam Operation", 3GPP Draft; R14-1705583 ControlChannelBeamRobustness, 3rd Generation Partnership Project (3GPP), Mobile Competence Centre, 650, Route Des Lucioles, F-06921 Sophia-Antipolis Cedex, France, vol. RAN WG1, No. Spokane, USA Mar. 25, 2017 (Mar. 25, 2017), XP051252325, 5 Pages, Retrieved from the Internet: URL:http://www.3gpp.org/ftp/tsg_ran/WG1_RL1/TSGR1_88b/Docs/ [retrieved on Mar. 25, 2017].

Vivo: "Beam Management and Beam Reporting", 3GPP Draft, 3GPP TSG RAN WG1 Meeting NR Ad-Hoc#2, R1-1710399, Beam Management and Beam Reporting, 3rd Generation Partnership Project (3GPP), Mobile Competence Centre, 650, Route Des Lucioles, F-06921 Sophia-Antipolis Cedex, France, vol. RAN WG1, No. Qingdao, Jun. 27, 2017-Jun. 30, 2017, Jun. 26, 2017 (Jun.. 26, 2017), XP051299611, 6 pages, Retrieved from the Internet: URL: http://www.3gpp.org/ftp/Meetings_3GPP_SYNC/RAN1/Docs/. [retrieved on Jun. 26, 2017] the whole document.

ZTE: "PUSCH Enhancements for NR URLLC," 3GPP Draft, 3GPP TSG RAN WG1 #96bis, R1-1904145, PUSCH Enhancements for NR URLLC, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Apr. 3, 2019 (Apr. 3, 2019), XP051707145, 7 pages, Retrieved from the Internet: URL: http://www.3gpp.org/ftp/tsg%5Fran/WG1%5FRL1/TSGR1%5F96b/Docs/R1%2D1904145%2Ezip [retrieved on Apr. 3, 2019] the whole document.

Qualcomm Incorporated: "Remaining Issues on Cross-Carrier Scheduling with Different Numerologies", 3GPP Draft, 3GPP TSG-RAN WG1 #98bis, R1-1911142, Remaining Issues on Cross-Carrier Scheduling with Different Numerologies, 3rd Generation Partnership Project (3GPP), Mobile Competence Centre, 650, Route Des Lucioles, F-06921, vol. RAN WG1, No. Chongqing, China, Oct. 14, 2019-Oct. 20, 2019, Oct. 5, 2019 (Oct. 5, 2019), XP051808865, 9 pages, Retrieved from the Internet: URL: https://ftp.3gpp.org/tsg_ran/WG1_RL1/TSGR1_98b/Docs/R1-1911142.zip. R1-1911142, Remaining issues on cross-carrier scheduling with differentnumerologies.docx. [retrieved on Oct. 5, 2019] pp. 1-3, 2.1 POSCH Beam Switch Latency in Cross-Carrier Scheduling pp. 3-5, 2.2 PDCCH-to-PDSCH Delay for Cross-Carrier Scheduling, the Whole Document.

Qualcomm Incorporated: "UE Adaptation to the Traffic and UE Power Consumption Characteristics", 3GPP Draft, 3GPP TSG-RAN WG1 Ad-Hoc Meeting 1901, R1-1900911 UE Adaptation for Power Saving, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593757,pp. 1-24 Retrieved from the Internet: URL: http://www.3gpp.org/ftp/tsg%5Fran/WG1%5FRL1/TSGR1%5FAH/NR%5FAH%5F1901/Docs/R1%2D1900911%2Ezip, [retrieved on Jan. 20, 2019], Chapters 1. 2.

ZTE: "Cross-Carrier CSI-RS Triggering with Mixed Numerology", 3GPP Draft, 3GPP TSG RAN WG1 Meeting #98bis, R1-1910291, Cross-Carrier CSI-RS Triggering with Mixed Numerology, 3rd Generation Partnership Project (3GPP), Mobile Competence Centre, 650, Route Des Lucioles, F-06921 Sophia-Antipolis C, vol. RAN WG1, No. Chongqing, China, Oct. 14, 2019-Oct. 20, 2019, Oct. 5, 2019 (Oct. 5, 2019), XP051808485, 4 pages, Retrieved from the Internet: URL: https://ftp.3gpp.org/tsg_ran/WG1_RL1/TSGR1_98b/Docs/R1-1910291.zip. R1-1910291 Cross-carrier CSI-RS triggering with mixed numerology.docx [retrieved on Oct. 5, 2019] the whole document.

* cited by examiner

300

| SCS (kHz) | CP length (μs) | Symbol duration (μs) |
|---|---|---|
| 15 | 4.69 | 66.67 |
| 30 | 2.345 | 33.335 |
| 60 | 1.725 | 16.668 |
| 120 | 0.5625 | 8.3338 |
| 240 | 0.29313 | 4.1669 |
| 480 | 0.14656 | 2.0834 |
| 960 | 0.07328 | 1.0417 |
| 1920 | 0.03664 | 0.5209 |
| 3840 | 0.01832 | 0.2604 |

FIG. 3

BEAM SWITCHING GAP

CROSS-REFERENCE TO RELATED APPLICATIONS

This application claims benefit to U.S. Provisional Patent Application Ser. No. 62/913,473, entitled "Beam Switching Gap," filed Oct. 10, 2019, and assigned to the assignee hereof, the contents of which are hereby incorporated by reference in its entirety.

BACKGROUND

Field of the Disclosure

Aspects of the present disclosure relate to wireless communications, and more particularly, to techniques for a beam switching gap.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include a beam switching gap that can be dynamically configured/indicated and that can be at least one symbol in length, for example, to accommodate high frequency ranges and/or larger subcarrier spacing (SCS).

One innovative aspect of the subject matter described in this disclosure can be implemented in a method for wireless communication by a user equipment (UE). The method generally includes receiving an allocation from a base station (BS) including an at least one symbol beam switching gap based, at least in part, on a SCS of the UE. The method generally includes communicating with the BS using the allocation.

One innovative aspect of the subject matter described in this disclosure can be implemented in a method for wireless communication by BS. The method generally includes sending an allocation to a UE including an at least one symbol beam switching gap based, at least in part, on a SCS of the UE. The method generally includes communicating with the UE using the allocation.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 is a table illustrating example subcarrier spacing (SCS) and corresponding cyclic prefix (CP) and symbol duration, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
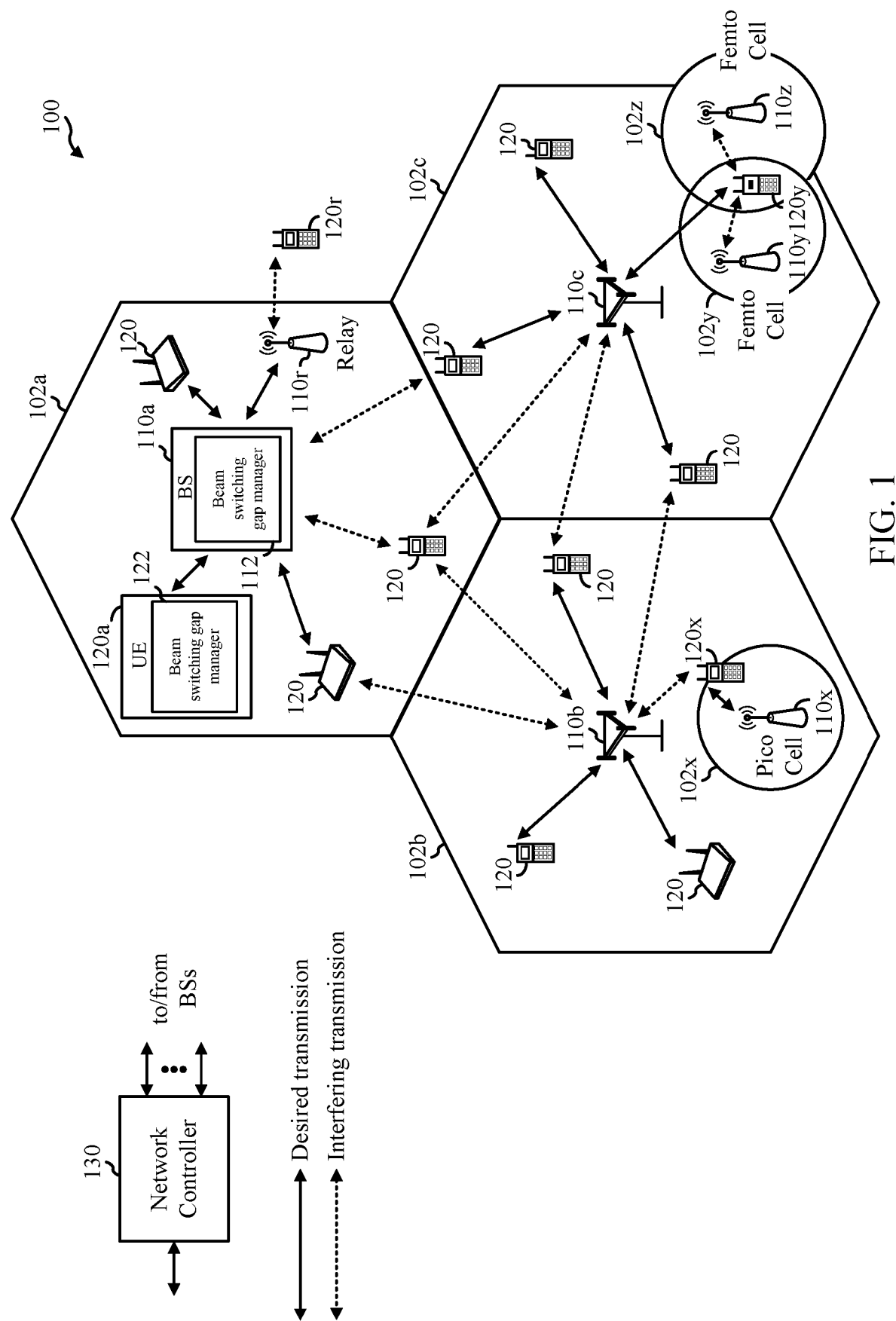
FIG. 1 is a block diagram conceptually illustrating an example telecommunications system, in accordance with certain aspects of the present disclosure.

Aspects of the present disclosure provide apparatus, methods, processing systems, and computer readable mediums for communications between a user equipment (UE) and a network entity (e.g., a base station, such as a gNodeB) using a beam switching gap to allow the UE and network entity to rapidly switch between different beams for communications between the UE and the network entity.

In certain systems, such as millimeter wave (mmW) in new radio (5G NR), different transmissions use different beams (e.g., different transmit and/or different receive beams). It may take some time for a device, such as a base station (BS) or user equipment (UE), to switch the beams (e.g., time to switch, activate/deactivate, and/or retune radio frequency (RF) components). In some systems, a configured cyclic prefix (CP) covers the time used for switching the beams. In some cases; however, the CP may not provide sufficient time for the beam switching. For example, when the subcarrier spacing (SCS), or tone spacing, is larger (e.g., which may be the case at higher frequency ranges that may be used in NR), the corresponding symbol duration becomes shorter. Therefore, the CP length also becomes shorter and may be insufficient for the beam switching.

Accordingly, aspects of the present disclosure provide a beam switching gap. The beam switching gap may be separate from the CP, may be dynamically allocated (e.g., configured/indicated), and may take into account UE capability, BS capability, and SCS, for example. The beam switching gap may be explicitly or implicitly allocated.

The following description provides examples of a beam switching gap in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

5G NR may utilize OFDM with a cyclic prefix (CP) on the uplink and downlink and include support for half-duplex operation using time division duplexing (TDD). A subframe can be 1 ms, but the basic transmission time interval (TTI) may be referred to as a slot. A subframe contains a variable number of slots (e.g., 1, 2, 4, 8, 16, . . . slots) depending on the subcarrier spacing (SCS). The NR resource block (RB) may be 12 consecutive frequency subcarriers. NR may support a base SCS of 15 KHz and other subcarrier spacing may be defined with respect to the base SCS, for example, 30 kHz, 60 kHz, 120 kHz, 240 kHz, etc. The symbol and slot lengths scale with the SCS. The CP length also depends on the SCS. 5G NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for a beam switching gap. As shown in FIG. 1, the BS 110a includes a beam switching gap manager 112. The beam switching gap manager 112 may be configured to send an allocation to the UE 120a including an at least one symbol beam switching gap based, at least in part, on a SCS of the UE 120a and to communicate with the UE 120a using the allocation, in accordance with aspects of the present disclosure. In some examples, the beam switching gap manager 112 may allocate the beam switching gap further based on a reported capability from the UE 120a and/or based on a capability of the BS 110a. In some examples, the beam switching gap manager 112 may allocate the beam switching gap explicitly or implicitly to the UE 120a. As shown in FIG. 1, the UE 120a includes a beam switching gap manager 122. The beam switching gap manager 122 may be configured to receive an allocation from the BS 110a including an at least one symbol beam switching gap based, at least in part, on the SCS of the UE 120a and communicate with the BS 110 using the allocation, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
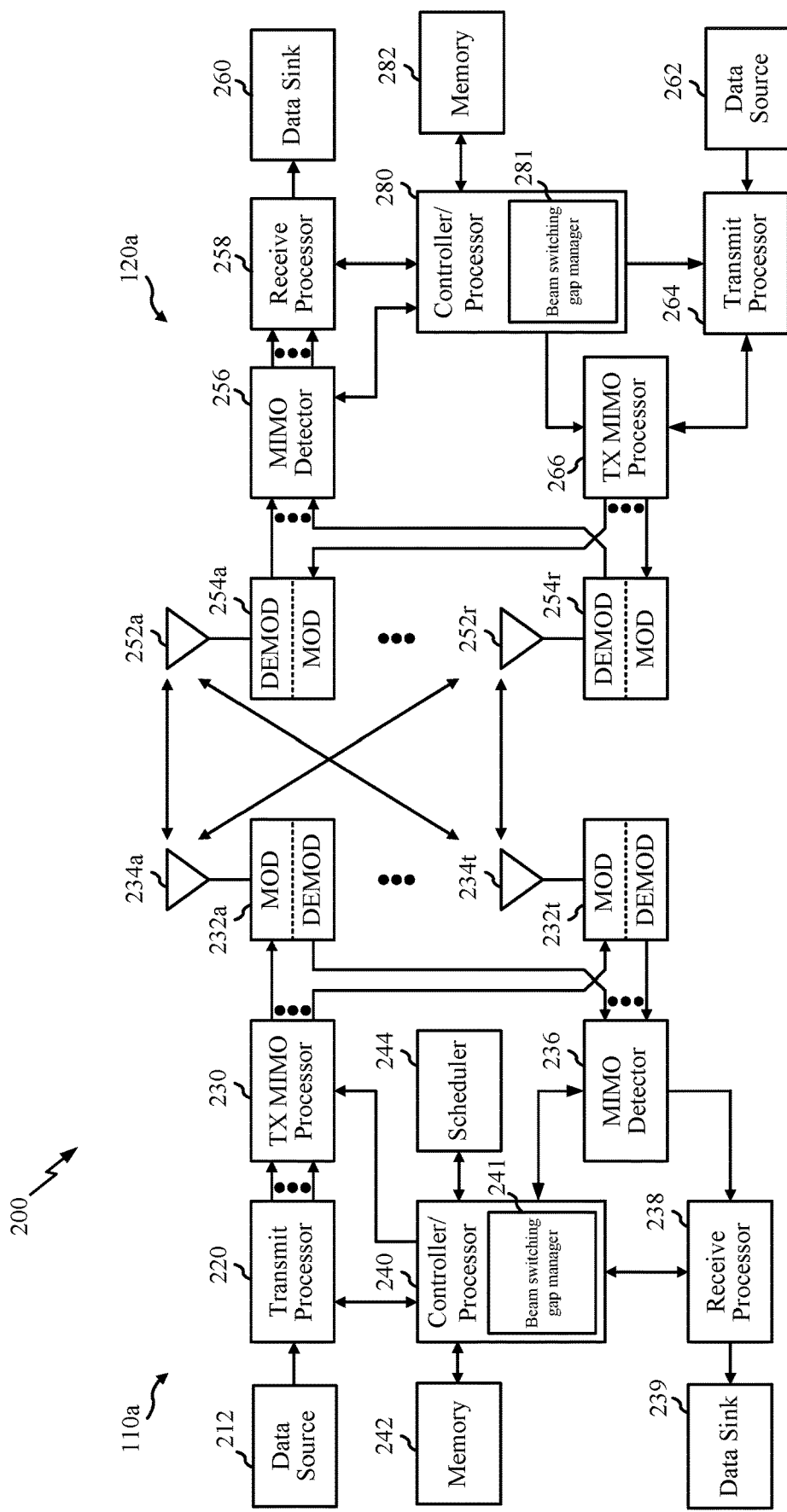
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a user-equipment (UE) to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has an beam switching gap manager 241 that may be configured to send an allocation to the UE 120a including an at least one symbol beam switching gap based, at least in part, on a SCS of the UE 120a and to communicate with the UE 120a using the allocation, according to aspects described herein. As shown in FIG. 2, the controller/processor 280 of the UE 120a has a beam switching gap manager 241 that may be configured to receive an allocation from the BS 110a including an at least one symbol beam switching gap based, at least in part, on the SCS of the UE 120a and communicate with the BS 110 using the allocation, according to aspects described herein. Although shown at the controller/processor, other components of the UE 120a and BS 110a may be used to perform the operations described herein.

As mentioned above, aspects of the disclosure relate to a beam switching gap. As discussed above, a UE and/or BS may take time to switch beams (e.g., around 0.1 µs). The time for switching beams may be based on the capability of the device. For example, a lower capability UE and/or BS may take longer to switch beams and a higher capability UE and/or BS may take a shorter time to switch beams.

FIG. 3 is a table 300 illustrating example SCS and corresponding CP length and symbol duration, in accordance with certain aspects of the present disclosure. Generally, as illustrated in FIG. 3, the CP length may be inversely proportional to the SCS, such that smaller SCSs are associated with longer CP lengths, and vice versa and may be applicable to communications on the physical downlink shared channel (PDSCH) and the physical uplink shared channel (PUSCH).

As discussed above, in some systems, the CP may be used to cover the time used for switching the beams used to communicate between a UE and a base station. For example, in frequency range (FR2) mmW with a 60 kHz or 120 kHz SCS, the CP length of 1.725 µs and 0.5625 µs (as shown in FIG. 3), respectively, may be sufficient to cover the beam switching duration, as the CP length for both the 60 kHz and 120 kHz SCSs are significantly longer than a 0.1 µs beam switching duration. In some cases, however, the CP length may not provide sufficient time for the beam switching. For example, in certain systems such as highband systems (e.g., mmW systems operating above 52.6 GHz), larger SCSs may be used, corresponding to short symbol duration and CP length. As shown in FIG. 3, for an SCS of 480 kHz, the CP length is 0.14656 µs, and for an SCS of 3840 kHz, the CP length is reduced to 0.01832 µs. Thus, at the higher SCSs, the CP length may be insufficient to cover the beam switching duration, and an entire symbol may be needed to cover a beam switching duration in which different beams are used for communications between the UE and the base station.

Accordingly, what is needed are techniques and apparatus for a beam switching gap.

Example Beam Switching Gap

Accordingly, aspects of the present disclosure provide a beam switching gap that can be used to allow for switching of beams used for communications between a UE and a base station (BS). The beam switching gap may be separate from the CP. In some cases, the beam switching gap may take an entire symbol or even more than one symbol. As discussed in more detail below, the beam switching may be dynamically allocated. For example, a BS can allocate resources to a user equipment (UE) for a beam switching gap, taking into the subcarrier spacing (SCS), a reported UE capability for beam switching, and/or the BS's capability for beam switching. In some examples, the BS can allocate the beam switching gap explicitly or implicitly.

Figure 4:
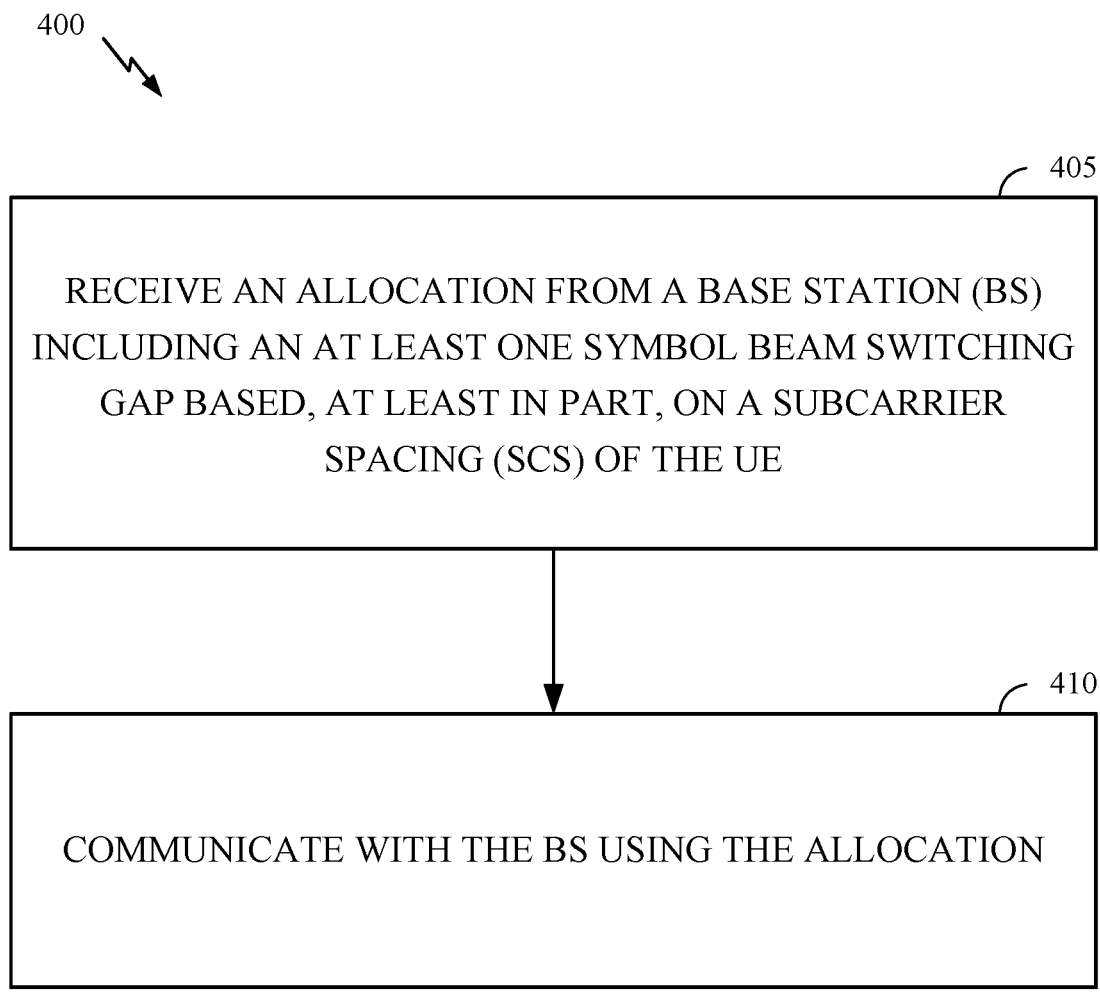
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 405, by receiving an allocation from a BS including an at least one symbol beam switching gap based, at least in part, on a SCS of the UE.

According to certain aspects, the allocation including the beam switching gap may be determined based on beam switching capability information provided by the UE to the BS. The beam switching capability information may be provided to the BS, for example, in a capability information message, capability report, or other uplink signaling from the UE to the BS. For example, a capability report transmitted by the UE may indicate whether a full symbol (or multiple symbol) beam switching gap is requested.

Figure 5:
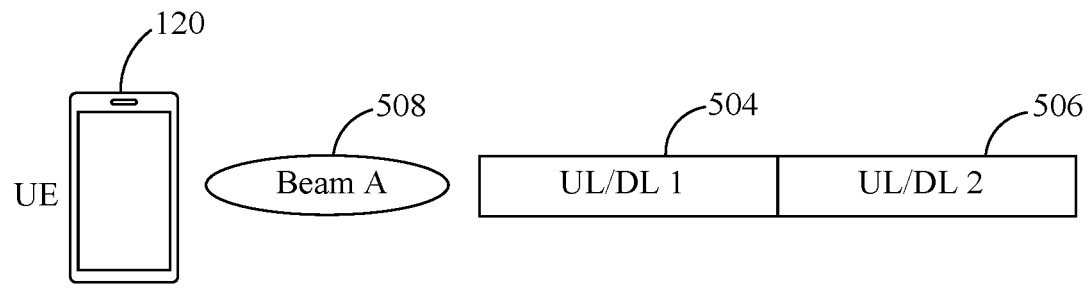
FIG. 5 illustrates example transmissions using a same beam without a beam switching gap, in accordance with certain aspects of the present disclosure.

In some examples, the UE may indicate that the beam switching gap is requested for sequential transmissions or receptions using different beams. As shown in FIG. 5, for subsequent transmissions 504, 506 (e.g., sent on the uplink or received on the downlink) using a same beam 508, the UE 120 may send or receive the transmissions without a beam switching gap.

Figure 6:
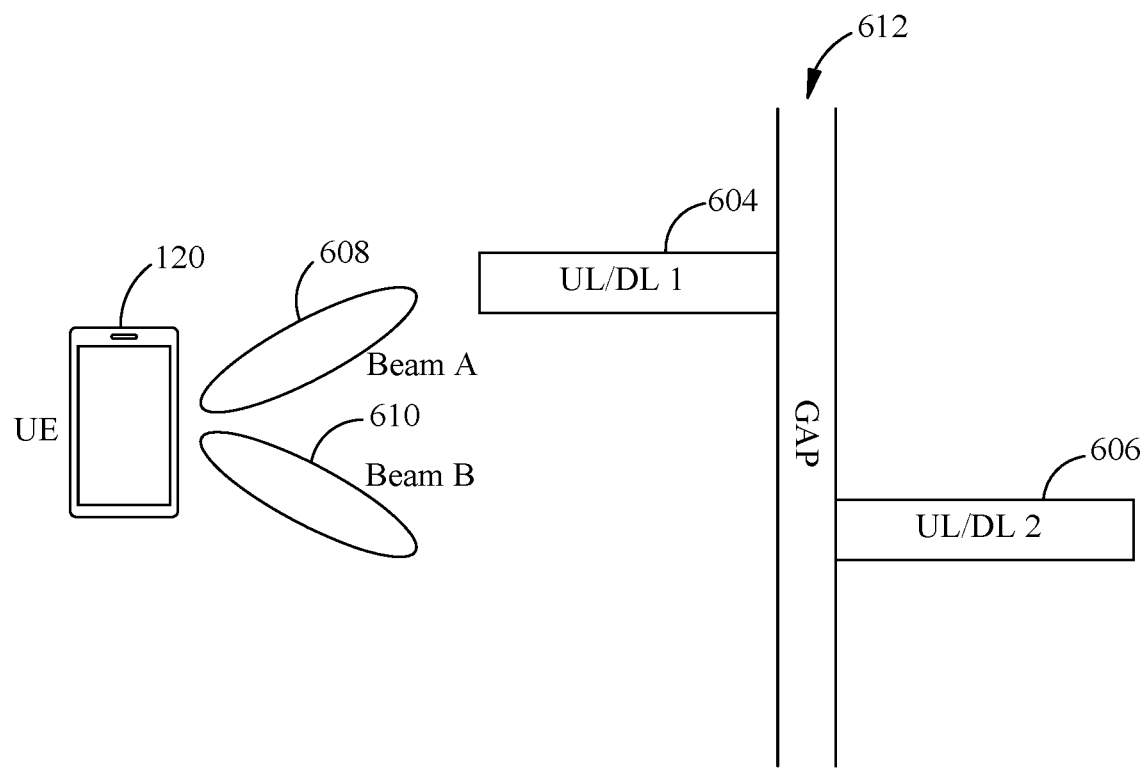
FIG. 6 illustrates example transmissions using different beams with a beam switching gap, in accordance with certain aspects of the present disclosure.

As shown in FIG. 6, for subsequent transmissions 604, 606 (e.g., sent on the uplink or received on the downlink) using a different beams 608, 610, respectively, the UE 120 may send or receive the transmissions using a beam switching gap 612 to change from the beam 608 used for the transmission 604 (e.g., a UE RX beam for a DL transmission or UE TX beam for an UL transmission) to the beam 610 for the transmission 606 (e.g., a UE RX beam for a DL transmission or UE TX beam for an UL transmission. The beam switching gap 612 may be a duration of one or multiple beams based, for example, on a speed at which a UE can switch beams. For example, low capability UEs, such as low-power UEs, or UEs with a limited number of transmit/receive chains, may switch beams more slowly than other UEs (e.g., UEs with multiple transmit/receive chains). Thus, the beam switching gap allocated for these low capability UEs may be longer in duration that the beam switching cap allocated for other UEs that may not be so limited.

In some examples, the uplink transmission is a physical uplink shared channel (PUSCH) transmission. In some examples, the downlink transmission is a physical downlink shared channel (PDSCH) transmission. As will be discussed in more detail below, the allocation of the beam switching gap may also be based on capability of the BS.

The beam switching gap may be configured for any combination of uplink and downlink transmissions and for any combination of data and control channels. For example, the beam switching gap may be configured such that a first beam is used for a channel, and a second beam (to which communications are switched during the beam switching gap) is used for the same channel. That is, different beams may be used for subsequent communications on the same channel (e.g., for a first and a second transmission on the PUSCH, a first and a second transmission on the PDSCH, a first and a second transmission on the PUCCH, or a first and a second transmission on the PDCCH). In another example, the beam switching gap may be configured such that the first beam may be used for communications using a first channel, and a second beam (to which communications are witched during the beam switching gap) may be used for communications using a second channel. The first and second channels may be channels used for communications in the same direction but carrying different types of data (e.g., the first channel may be a PUSCH and the second channel may be a PUCCH, or vice versa).

According to certain aspects, the beam switching gap may be allocated by an explicit indication. For example, the BS can indicate the allocation in downlink control information (DCI) with a time domain resource allocation (TDRA) field indicating one of multiple radio resource control (RRC) TDRA configurations. In some embodiments, the indicated one of the multiple RRC TDRA configurations may be one of a plurality of TDRA configurations defined in a TDRA table or by a TDRA configuration configured at the UE.

Entries in the TDRA table (or equation) may configure a number of symbols of the uplink or downlink transmission. The TDRA table may have up to 16 rows. Each row in the TDRA may configure start and length indicator values (SLIV) for the transmissions (e.g., for a PUSCH or PDSCH). A DCI (e.g., in a physical downlink control channel (PDCCH)), may carry uplink and/or downlink grants for the UE. Each row in the TDRA may configure K2 values (e.g., using 3 bits) indicating a delay between the DCI and the scheduled uplink transmission (for an UL TDRA) or K0 values (e.g., using 2 bits) indicating a delay between the DCI and the scheduled downlink transmission (for a DL TDRA). Thus, the DCI can indicate a row index (e.g., using 5 bits) from the TDRA table indicating the K0/K2 and SLIV values. In some examples, the SLIV may be jointly encoded. For example, for a given length L and start symbol S, the value in the TDRA table may be computed according to the following equations. If $(L-1)<7$, then $RIV=14(L-1)+S$. Otherwise (i.e., if $(L-1)>=7$), $RIV=14(14-L+1)+(14-1-S)$.

According to certain aspects, when the beam switching gap is allocated, the number of symbols indicated by the DCI may be reduced by the at least one symbol. In some examples, a SLIV field in the DCI indicates a length that is reduced by at least one symbol to allocate the beam switching gap. In some examples, the CP (or CP extension) can be used when the CP is sufficient for the beam switching.

According to certain aspects, two different SLIV combinations may be used (e.g., configured in the TDRA table and can be indicated by the DCI). A first SLIV of the different SLIV combinations generally includes the last symbol, and a second SLIV of the different SLIV combinations generally does not include the last symbol. The SLIV including the last symbol is generally used when the next allocation (e.g., adjacent or subsequent transmission) uses the same beam, and therefore the beam switching gap is not used. The SLIV not including the last symbol is generally used when the next allocation uses a different beam, and therefore the beam switching gap is used to switch beams between communications.

In some examples, two different SLIVs may be defined. For example, a first SLIV field is used when the at least one symbol beam switching gap is not allocated and a separate second SLIV field is used when the at least one symbol beam switching gap is allocated. In some examples, a single SLIV field is used for assignment, and a bit in the DCI indicates whether the last at least one symbol is included or not.

According to certain aspects, the beam switching gap may be implicitly indicated.

According to certain aspects, the can use side information to determine whether the beam switching gap is allocated. In some examples, for downlink, the last at least one symbol may be punctured. In some examples, the UE can detect grants to determine whether the beam switching gap is allocated. In some examples, the UE determines the beam switching gap is not allocated in the time domain resources allocated by a first grant when there is another grant that indicates the same beam is used for the adjacent time domain resources after the time domain resource allocated by the first grant. In some examples, the UE determines the beam switching gap is allocated in the time domain resources allocated by the first grant when there is another grant that indicates a different beam is used for the adjacent time domain resources after the time domain resource allocated by the first grant. In some examples, the UE determines the beam switching gap is allocated in the time domain resources allocated by the first grant when or no other grant is received to allocate the time domain resources after the adjacent time domain resource allocated by the first grant.

According to certain aspects, the UE may demodulate the downlink transmission and null log likelihood ratios (LLRs) collected for resource elements (REs) in the at least one symbol when the beam switching gap is allocated. For example, the UE proceeds with normal demodulation (e.g., assuming the symbol is transmitted properly). If the UE determined (e.g., is informed or finds out) that the next symbol does not involve beam switching then the UE can null the LLRs collected for REs in the last symbol.

According to certain aspects, the UE does not receive any demodulation reference signal (DMRS) or DCI in the beam switching gap.

According to certain aspects, the UE is not allocated with a beam switching gap but the UE still uses the at least one symbol for beam switching. As discussed in more detail below, in this case, the BS may null the LLRs in the at least one symbol.

In some examples, a beam switching gap may be allocated between time division multiplexed (TDMed) control resource sets (CORESETs).

In some examples, a beam switching gap may be allocated after a CORESET to PDSCH if there is beam switching.

At 410, the UE communicates with the BS using the allocation. For example, the UE may switch beams during the at least one symbol in a first uplink or downlink transmission to use for a second uplink or downlink transmission.

Figure 7:
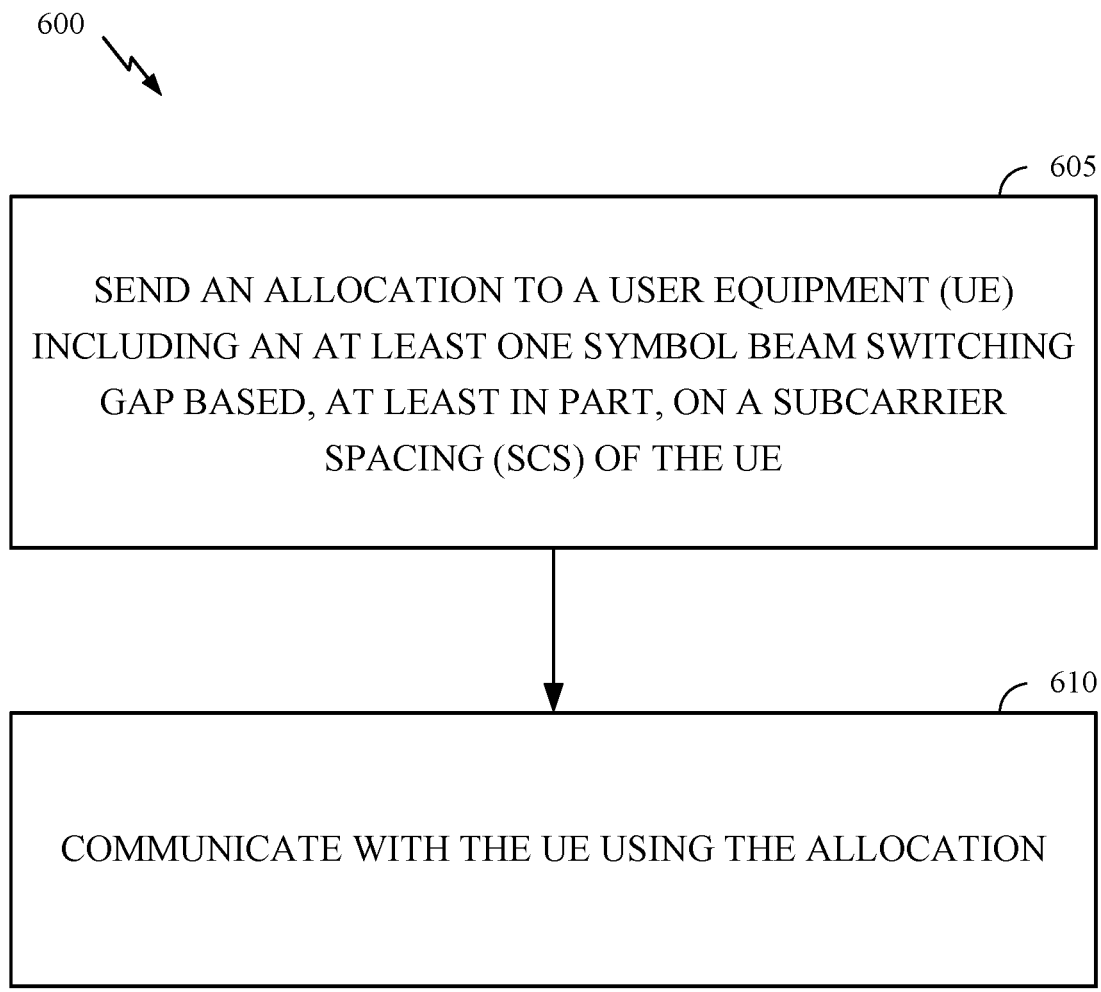
FIG. 7 is a flow diagram illustrating example operations for wireless communication by a BS, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., such as the BS 110*a* in the wireless communication network 100). The operations 700 may be complimentary operations by the BS to the operations 400 performed by the UE. Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at 705, by sending an allocation to a UE including an at least one symbol beam switching gap based, at least in part, on a SCS of the UE. For example, based on the SCS the BS can determine the length of the CP and whether the CP is sufficient for beam switching.

According to certain aspects, the BS receives beam switching capability information from the UE. When the BS receives beam switching capability information from the UE, the allocation including the beam switching gap may be further based on the beam switching capability information. For example, based on the capability information, the BS can determine how long the UE needs for beam switching and can take that into account when determining whether the CP is sufficient or whether the beam switching gap should be allocated.

Figure 8:
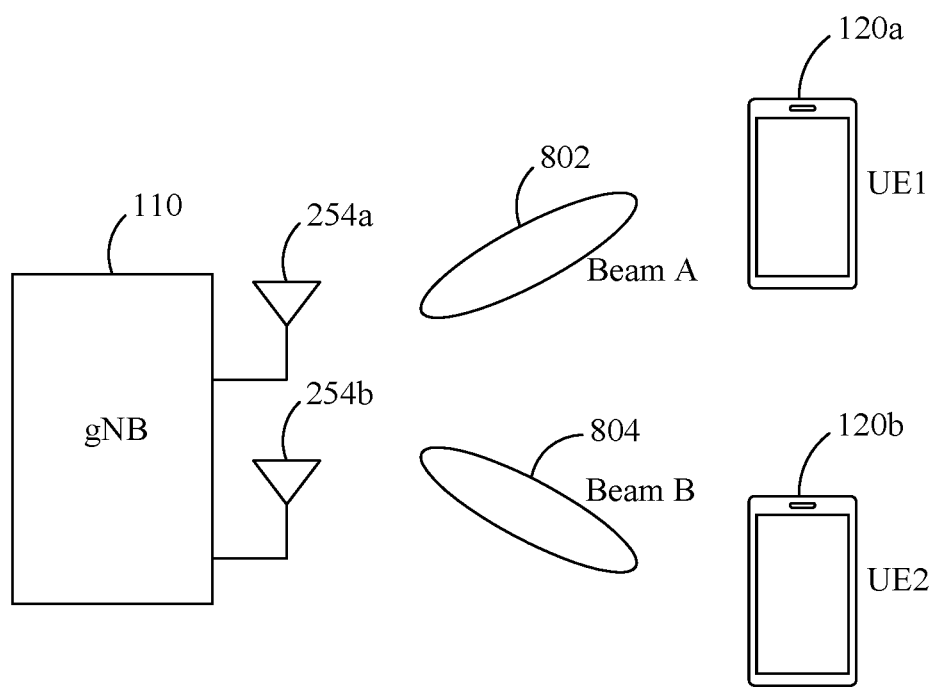
FIG. 8 illustrates example transmissions using different beams without a beam switching gap, in accordance with certain aspects of the present disclosure.
Figure 9:
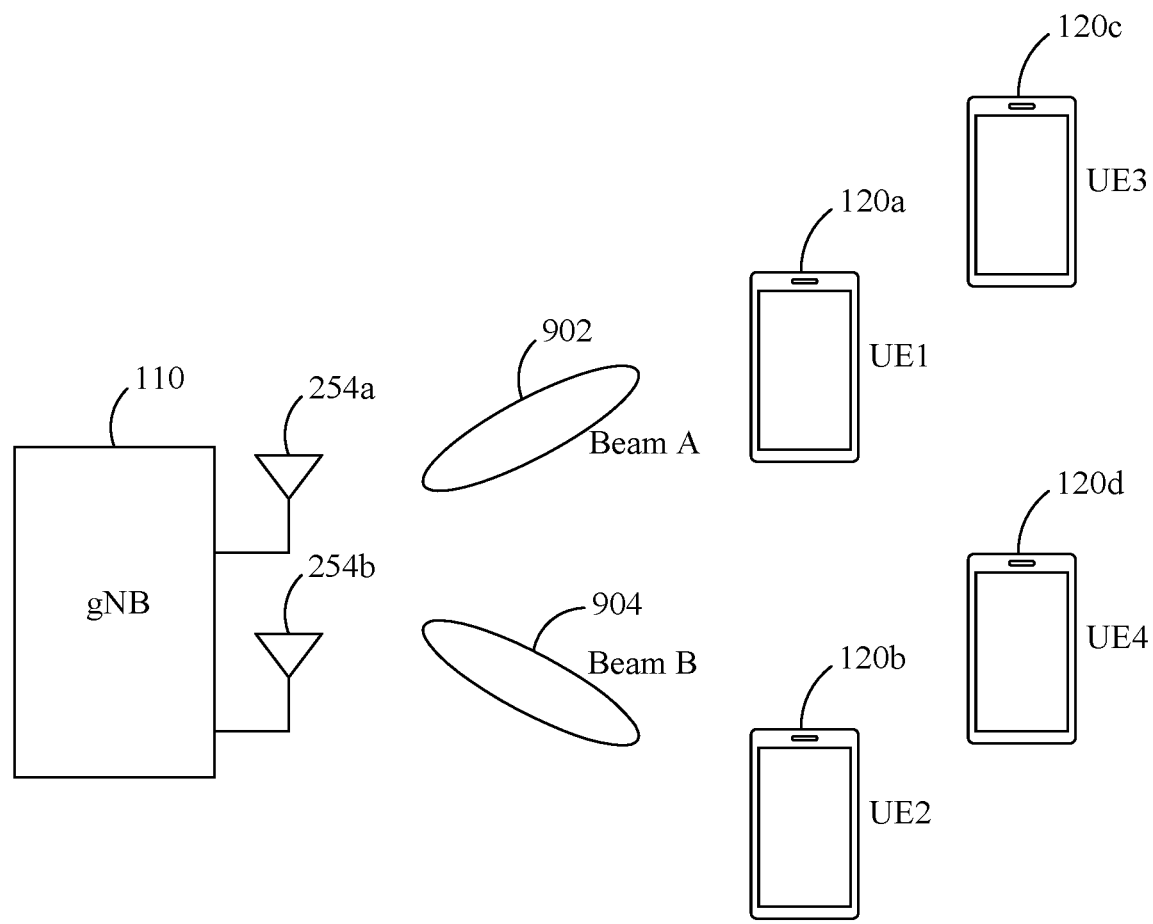
FIG. 9 illustrates example transmissions using different beams with a beam switching gap, in accordance with certain aspects of the present disclosure.

According to certain aspects, the allocation to the UE including the at least one symbol beam switching gap is further based on a beam switching capability of the BS. For example, the BS capability for supporting a beam switching gap may not be known, or provided, to the UE; however, the BS can take its capability into account when determining whether to allocate the beam switching gap to one or more of the UEs served by the BS. In some examples, the beam switching capability of the BS is based on a number of active users (e.g., in the cell) and a number of antenna panels at the BS. For example, as shown in FIG. 8, with two antenna panels 254*a*, 254*b*, the BS 110 uses one of the antenna panels 254*a* to serve the UE 120*a* using a first beam 802 and prepare the other antenna panel 254*b* for a subsequent scheduled communication with the UE 120*b* using a different beam 804 (or to the same UE 120*a* using the different beam 804). In this case, a beam switching gap need not be used, as different antenna panels may be used for communications using different beams. As shown in FIG. 9, with more active users (e.g., 120*a*-120*d*), the two antenna panel BS 110 uses the beam switching gap to switch the beams 902, 904 for serving the multiple active users. Thus, if the UE uses a beam switching gap, the BS can allocate the gap in the RRC configuration or dynamic scheduling.

As discussed above, the beam switching gap may be allocated by an explicit indication, for example, using the DCI with the TDRA field. Two SLIV fields may be used, or one SLIV field may be used with the DCI bit of the SLIV field indicating whether the beam switching gap is allocated.

As discussed above, the beam switching gap may be implicitly indicated.

The BS can transmit grants to one or more UEs to indicate whether the beam switching gap is allocated. In some examples, the BS sends a first grant to the UE allocating first time domain resources using a beam and a second grant allocating adjacent second time domain resources using the same beam to indicate the beam switching gap is not allocated in the first time domain resources allocated by the first grant. In some examples, the BS sends a first grant to the UE allocating first time domain resources using a beam and a second grant allocating adjacent second time domain resources using a different beam to indicate the beam switching gap is allocated in the first time domain resources allocated by the first grant.

In some examples, the BS does not allocated the beam switching gap. The DL symbol may be punctured and the UE handle nulling LLRs. In some examples, the UE uses beam switching in the last symbol and the BS handles nulling LLRs.

According to certain aspects, the BS does not schedule or transmit any DMRS or DCI (e.g., does not piggyback the DCI on the PDSCH) in the beam switching gap.

In some examples, the BS allocated a beam switching gap between TDMed CORESETs. In some examples, the BS allocates a beam switching gap after a CORESET to PDSCH if there is beam switching.

At 710, the BS communicates with the UE using the allocation. For example, the BS may switch beams during the at least one symbol in a first uplink (e.g., PUSCH) or downlink (e.g., PDSCH) transmission to use for a second uplink or downlink transmission.

Figure 10:
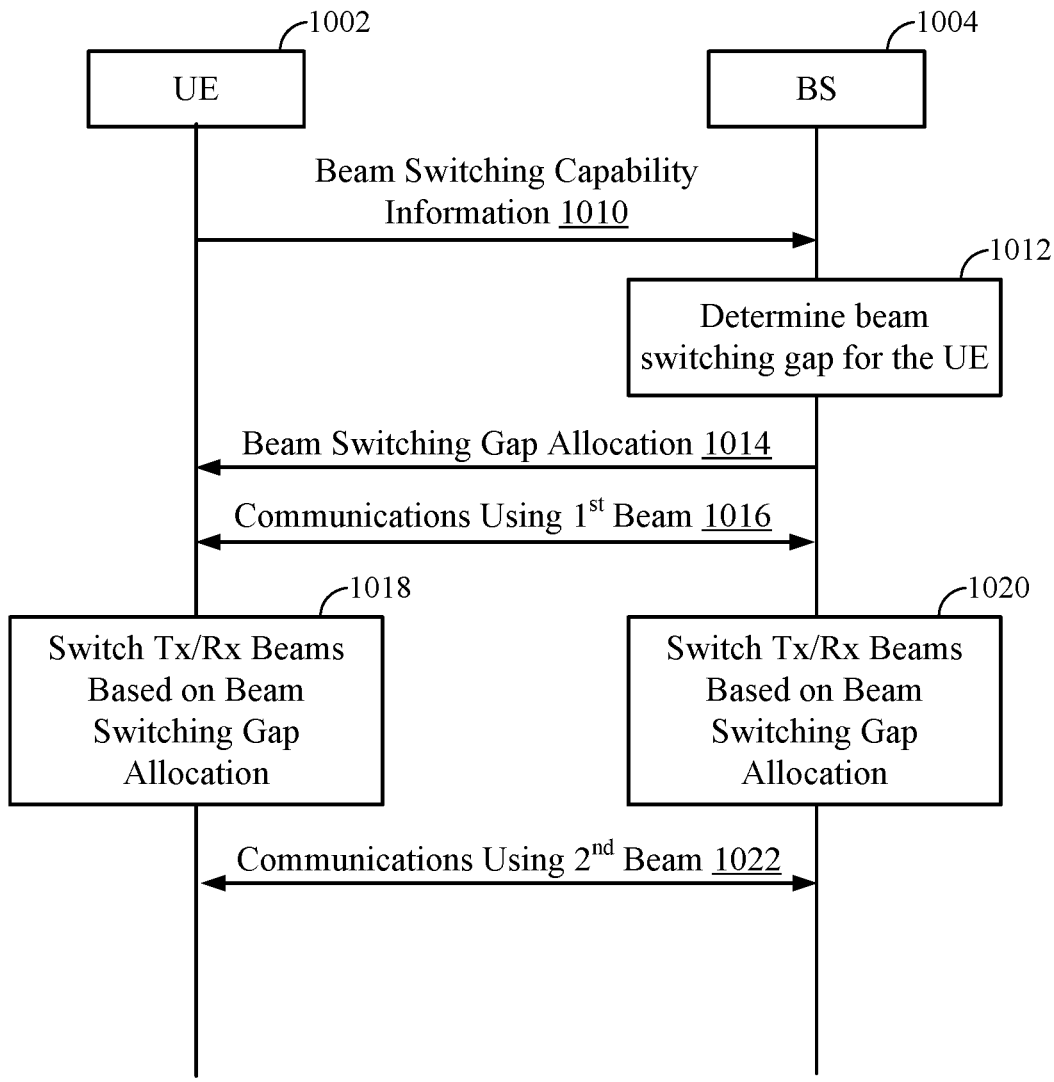
FIG. 10 illustrates a call flow diagram showing example messages that may be exchanged between a UE and a BS to communicate using a plurality of beams based on a beam switching gap, in accordance with certain aspects of the present disclosure.

FIG. 10 illustrates a call flow diagram of example messages that may be exchanged between a UE 1002 and a BS 1004 to configure a beam switching gap and communicate with each other (e.g., perform uplink and downlink communications) based on the beam switching gap.

As illustrated, the UE 1002 may transmit, to the BS 1004, beam switching capability information 1010. Beam switching capability information 1010 may include, for example, an indication of a number of symbols that a UE is requesting for a beam switching gap to allow the UE to switch beams for communications with the BS. In another example, the beam switching capability information 1010 may indicate whether the beam switching gap is requested for sequential transmissions or sequential receptions using different beams.

At block 1012, the BS 1004 determines a beam switching gap for the UE. The BS 1004 may determine the beam switching gap, for example, based at least on the SCS of the UE 1002. As discussed, the SCS of the UE 1002, and the associated CP length associated with the SCS of the UE 1002, may be used to determine if a beam switching gap (e.g., of one or more symbols) is to be allocated to the UE. For example, where the CP length for a given SCS is greater than 0.1 μs, the BS may determine that no beam switching gap need be allocated for the UE. However, for larger SCSs for which the CP length is less than 0.1 μs, the BS may determine that a beam switching gap (of one or multiple symbols) is to be allocated for the UE. In some aspects, the BS 1004 may determine the beam switching gap for the UE based further on the capability information transmitted to the BS 1004 in beam switching capability information 1010. For example, the BS 1004 may determine whether a beam switching gap is to be allocated for the UE 1002 based on an amount of time the UE needs to switch beams (e.g., as indicated in beam switching capability information 1010). If beam switching can be accomplished within the amount of time indicated in beam switching capability information 1010, the BS 1004 may determine that no beam switching gap need be allocated for the UE; otherwise, the BS 1004 may determine that a beam switching gap of one or more symbols may be allocated for the UE.

Subsequently, BS 1004 may transmit a beam switching gap allocation 1014 to UE 1002. Beam switching gap allocation 1014 generally indicates, to a UE 1002, a time at which beams used for uplink and/or downlink communications with the BS 1004 may be switched from a first beam to a second beam. As discussed, the beam switching gap indicated in beam switching gap allocation 1014 may indicate that no beam switching gap is allocated (e.g., when beam switching may be accomplished within the CP length for the SCS of UE 1002 or within an amount of time the UE needs to switch beams) or that one or multiple symbols are allocated for the beam switching gap (e.g., when beam switching may not be accomplished within the CP length for the SCS of UE 1002 or within an amount of time the UE needs to switch beams).

The UE 1002 may perform communications 1016 using a first beam. The communications 1016 using the first beam may be uplink and/or downlink communications performed over a number of symbols prior to a time at which beams are switched for communications between the UE 1002 and the BS 1004.

After communications have been performed on the symbols prior to the time at which beams are switched for communications between the UE 1002 and the BS 1004, the UE and BS may switch transmission and/or reception beams based on the beam switching gap allocation at blocks 1018 and 1020, respectively. As discussed, UE 1002 and BS 1004 may switch beams by switching a single antenna from a first beam direction to a second beam direction or by switching from communicating using a first antenna configured to communicate using a first set of beams to a second antenna configured to communicate using a second set of beams. The time elapsed to switch beams may fit within a CP (where no beam switching gap is allocated) or within one or more symbols allocated for a beam switching gap (e.g., where the amount of time needed to switch beams exceeds the CP length for the SCS used by the UE 1002). Subsequently, the UE 1002 may perform communications 1022 using the second beam.

Figure 11:
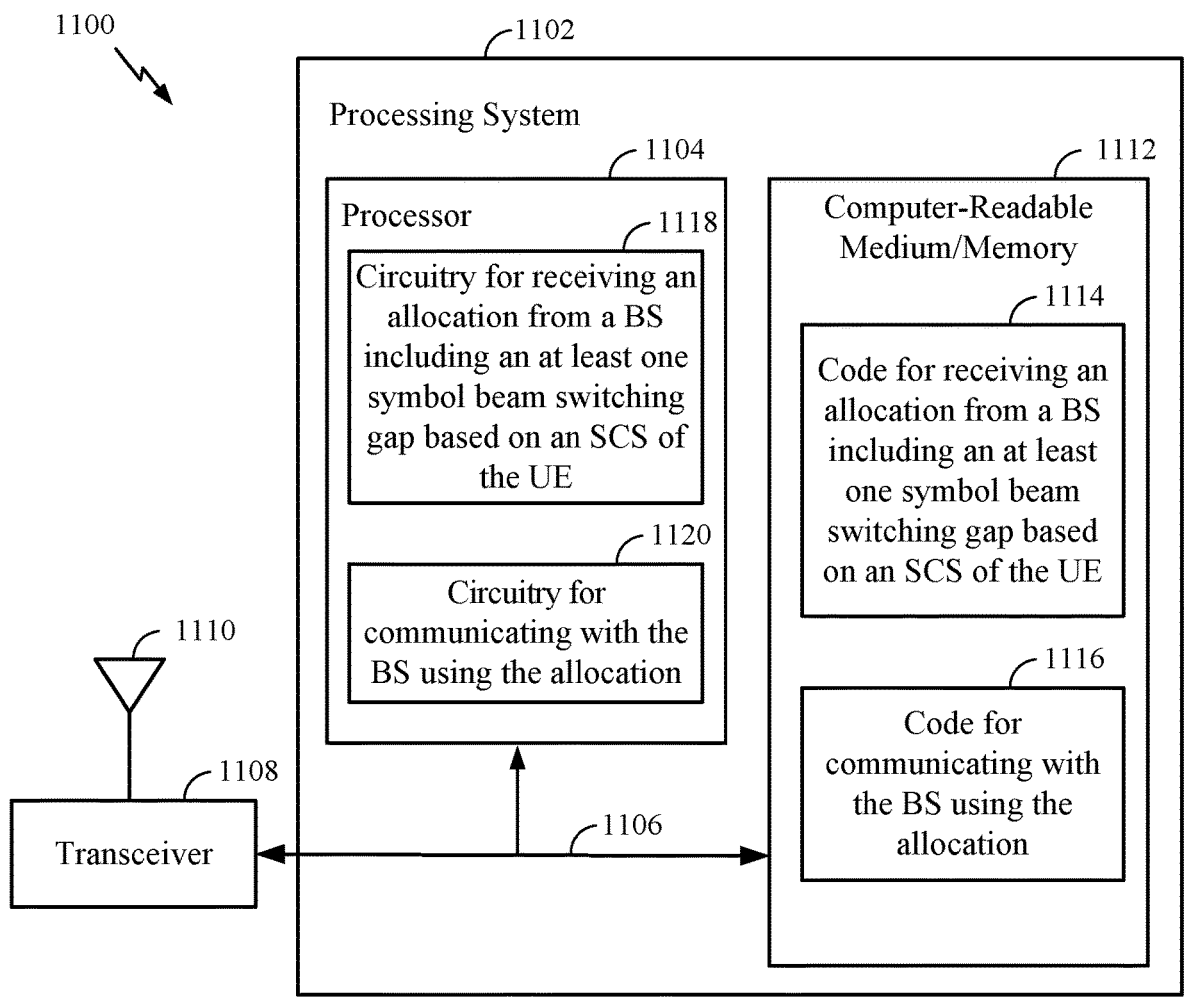
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 4. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 4, or other operations for performing the various techniques discussed herein for a beam switching gap. In certain aspects, computer-readable medium/memory 1112 stores code 1114 for receiving an allocation from a BS including an at least one symbol beam switching gap based, at least in part, on a SCS of the UE; and code 1116 for communicating with the BS using the allocation, in accordance with aspects of the present disclosure. In certain aspects, the processor 1104 has circuitry configured to implement the code stored in the computer-readable medium/memory 1112. The processor 1104 includes circuitry 1118 for receiving an allocation from a BS including an at least one symbol beam switching gap based, at least in part, on a SCS of the UE; and circuitry 1120 for communicating with the BS using the allocation, in accordance with aspects of the present disclosure.

Figure 12:
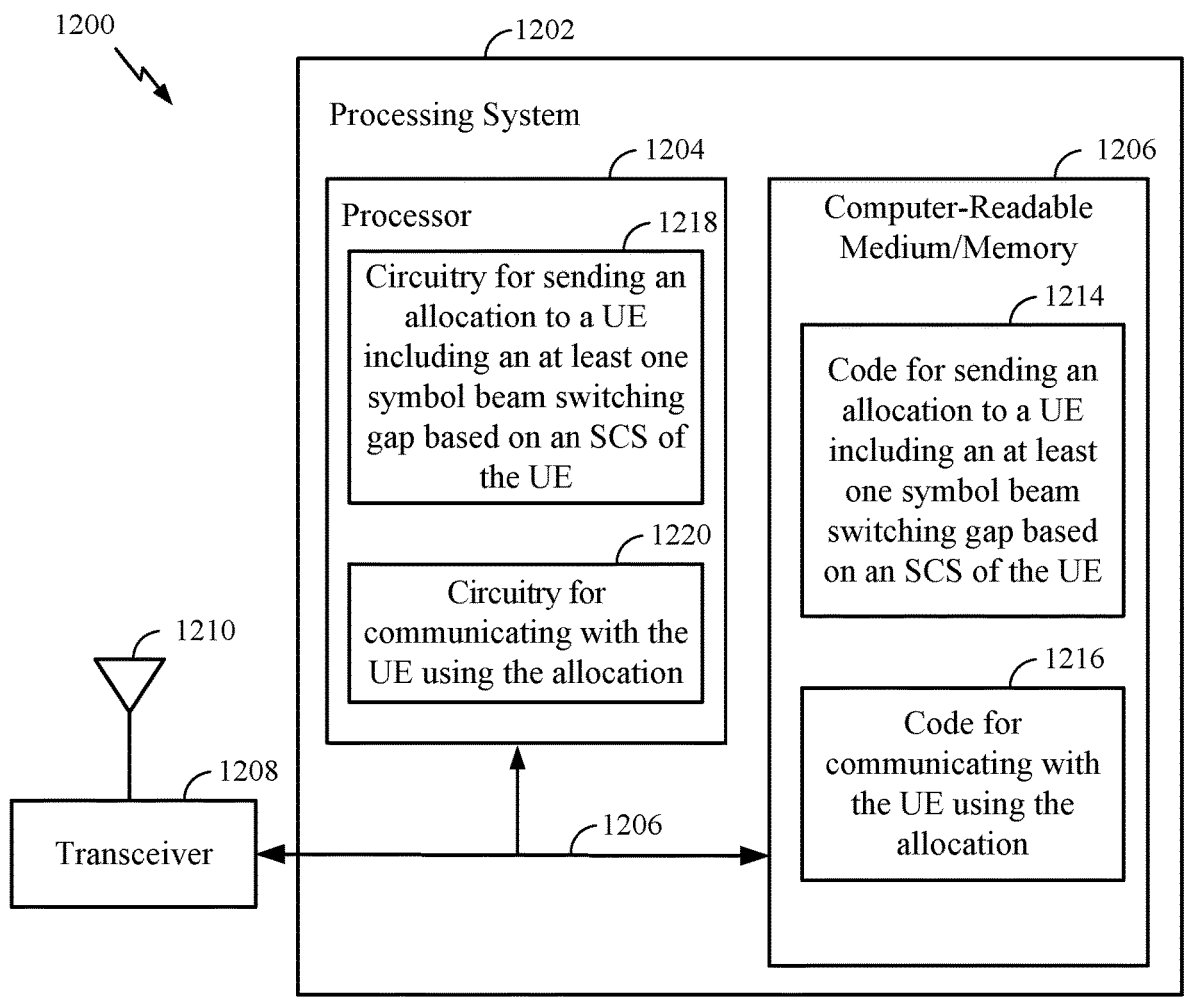
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7, or other operations for performing the various techniques discussed herein for a beam switching gap. In certain aspects, computer-readable medium/memory 1212 stores code 1214 for sending an allocation to a UE including an at least one symbol beam switching gap based, at least in part, on a SCS of the UE; and code 1216 for communicating with the UE using the allocation, in accordance with aspects of the present disclosure. In certain aspects, the processor 1204 has circuitry configured to implement the code stored in the computer-readable medium/memory 1212. The processor 1204 includes circuitry 1218 for sending an allocation to a UE including an at least one symbol beam switching gap based, at least in part, on a SCS of the UE; and circuitry 1220 for communicating with the UE using the allocation, in accordance with aspects of the present disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   receiving an allocation from a base station (BS) including at least one symbol beam switching gap based, at least in part, on a subcarrier spacing (SCS) of the UE, wherein receiving the allocation from the BS for the at least one symbol beam switching gap comprises:
   detecting one or more grants from the BS;
   determining the at least one symbol beam switching gap is not allocated in time domain resources allocated by a first grant when there is another grant that indicates the same beam is used for adjacent time domain resources after the time domain resources allocated by the first grant; and
   determining the at least one symbol beam switching gap is allocated in the time domain resources allocated by the first grant when:
   there is another grant that indicates a different beam is used for the adjacent time domain resources after the time domain resources allocated by the first grant, or
   no other grant is received to allocate the time domain resources after the adjacent time domain resources allocated by the first grant; and
   communicating with the BS using the allocation.

2. The method of claim 1, further comprising providing beam switching capability information to the BS, wherein the allocation includes the at least one symbol beam switching gap further based on the beam switching capability information.

3. The method of claim 1, wherein communicating with the BS using the allocation comprises switching beams during the at least one symbol beam switching gap in a first uplink or downlink transmission to use for a second uplink or downlink transmission.

4. The method of claim 3, wherein the first uplink or downlink transmission comprises a transmission on a channel using a first beam, and the second uplink or downlink transmission comprises a transmission on the channel using a second beam.

5. The method of claim 3, wherein the first uplink or downlink transmission comprises a transmission on a shared channel, and the second uplink or downlink transmission comprises a transmission on a control channel.

6. The method of claim 3, wherein the uplink transmission comprises a physical uplink shared channel (PUSCH) transmission and the downlink transmission comprises a physical downlink shared channel (PDSCH) transmission.

7. The method of claim 1, wherein the allocation from the BS comprises downlink control information (DCI) with a time domain resource allocation (TDRA) field indicating one of multiple radio resource control (RRC) TDRA configurations.

8. The method of claim 7, wherein:
   the TDRA configuration configures a number of symbols for uplink or downlink transmission; and
   the number of symbols is reduced by at least one symbol when the at least one symbol beam switching gap is allocated.

9. The method of claim 8, wherein the number of symbols is indicated by a start and length indicator value (SLIV) field in the TDRA.

10. The method of claim 9, wherein a first SLIV field is used when the at least one symbol beam switching gap is not allocated and a separate second SLIV field is used when the at least one symbol beam switching gap is allocated.

11. The method of claim 9, wherein a single SLIV field is used and a bit in the DCI indicates whether the at least one symbol is included.

12. The method of claim 1, further comprising:
   demodulating a downlink transmission; and
   nulling log likelihood ratios (LLRs) for resource elements (REs) in at least one symbol when the at least on symbol beam switching gap is allocated.

13. A method for wireless communications by a base station (BS), comprising:
   sending an allocation to a user equipment (UE) including at least one symbol beam switching gap based, at least in part, on a subcarrier spacing (SCS) of the UE, wherein sending the allocation comprises:
   sending a first grant to the UE allocating first time domain resources using a beam and a second grant allocating adjacent second time domain resources using the same beam to indicate the at least one symbol beam switching gap is not allocated in the first time domain resources allocated by the first grant; and
   sending the first grant to the UE allocating first time domain resources using the beam and the second grant allocating adjacent second time domain resources using a different beam to indicate the at least one symbol beam switching gap is allocated in the first time domain resources allocated by the first grant; and communicating with the UE using the allocation.

14. The method of claim 13, further comprising receiving beam switching capability information from the UE, wherein sending the allocation including the at least one symbol beam switching gap is further based, at least in part, on the beam switching capability information.

15. The method of claim 13, wherein communicating with the UE using the allocation comprises switching beams during the at least one symbol beam switching gap in a first uplink or downlink transmission to use for a second uplink or downlink transmission.

16. The method of claim 15, wherein the first uplink or downlink transmission comprises a transmission on a channel using a first beam, and the second uplink or downlink transmission comprises a transmission on the channel using a second beam.

17. The method of claim 15, wherein the first uplink or downlink transmission comprises a transmission on a shared channel, and the second uplink or downlink transmission comprises a transmission on a control channel.

18. The method of claim 15, wherein the uplink transmission comprises a physical uplink shared channel (PUSCH) transmission and the downlink transmission comprises a physical downlink shared channel (PDSCH) transmission.

19. The method of claim 13, wherein sending the allocation to the UE including the at least one symbol beam switching gap is further based on a beam switching capability of the BS.

20. The method of claim 19, wherein the beam switching capability of the BS is based on a number of active users and a number of antenna panels at the BS.

21. The method of claim 13, wherein the allocation comprises downlink control information (DCI) with a time domain resource allocation (TDRA) field indicating a radio resource control (RRC) TDRA configuration.

22. The method of claim 21, wherein:

the TDRA configuration configures a number of symbols for uplink or downlink transmission; and the number of symbols is reduced by at least one symbol when the at least one symbol beam switching gap is allocated.

23. The method of claim 22, wherein the number of symbols is indicated by a start and length indicator value (SLIV).

24. The method of claim 23, wherein a first SLIV field is used when the at least one symbol beam switching gap is not allocated and a separate second SLIV field is used when the at least one symbol beam switching gap is allocated.

25. The method of claim 23, wherein a single SLIV field is used and a bit in the DCI indicates whether the at least one symbol beam switching gap is included.

26. The method of claim 13, further comprising:

refraining from scheduling demodulation reference signals (DMRS) and downlink control information (DCI) in the at least one symbol beam switching gap.

27. The method of claim 13, further comprising:

nulling log likelihood ratios (LLRs) for resource elements (REs) in at least one symbol when the at least one symbol beam switching gap is not allocated.

28. An apparatus, comprising:

a memory; and at least one processor coupled with the memory and configured to:

receive an allocation from a base station (BS) including at least one symbol beam switching gap based, at least in part, on a subcarrier spacing (SCS) of the apparatus, wherein in order to receive the allocation from the BS, the processor is configured to cause the apparatus to:

detect one or more grants from the BS;

determine the at least one symbol beam switching gap is not allocated in time domain resources allocated by a first grant when there is another grant that indicates the same beam is used for adjacent time domain resources after the time domain resources allocated by the first grant; and determine the at least one symbol beam switching gap is allocated in the time domain resources allocated by the first grant when:

there is another grant that indicates a different beam is used for the adjacent time domain resources after the time domain resources allocated by the first grant, or no other grant is received to allocate the time domain resources after the adjacent time domain resources allocated by the first grant; and communicate with the BS using the allocation.

29. The apparatus of claim 28, wherein the processor is further configured to: provide beam switching capability information to the BS, wherein the allocation includes that at least one symbol beam switching gap further based on the beam switching capability information.

30. The apparatus of claim 28, wherein the processor is configured to communicate with the BS using the allocation by switching beams during at least one symbol in a first uplink or downlink transmission to use for a second uplink or downlink transmission.

31. The apparatus of claim 28, wherein the allocation from the BS comprises downlink control information (DCI) with a time domain resource allocation (TDRA) field indicating one of multiple radio resource control (RRC) TDRA configurations.

32. An apparatus, comprising:

a memory; and at least one processor coupled with the memory and configured to:

send an allocation to a user equipment (UE) including at least one symbol beam switching gap based, at least in part, on a subcarrier spacing (SCS) of the UE, wherein in order to send the allocation to the UE, the processor is configured to cause the apparatus to:

send a first grant to the UE allocating first time domain resources using a beam and a second grant allocating adjacent second time domain resources using the same beam to indicate the at least one symbol beam switching gap is not allocated in the first time domain resources allocated by the first grant; and send the first grant to the UE allocating first time domain resources using the beam and the second grant allocating adjacent second time domain resources using a different beam to indicate the at least one symbol beam switching gap is allocated in the first time domain resources allocated by the first grant; and communicate with the UE using the allocation.

33. The apparatus of claim 32, wherein the processor is further configured to receive beam switching capability information from the UE, and wherein the processor is configured to send the allocation based, at least in part, on the beam switching capability information.

34. The apparatus of claim 32, wherein the processor is configured to communicate with the UE using the allocation by switching beams during at least one symbol in a first uplink or downlink transmission to use for a second uplink or downlink transmission.

35. The apparatus of claim 32, wherein the allocation comprises downlink control information (DCI) with a time domain resource allocation (TDRA) field indicating a radio resource control (RRC) TDRA configuration.

36. An apparatus, comprising:
means for receiving an allocation from a base station (BS) including at least one symbol beam switching gap based, at least in part, on a subcarrier spacing (SCS) of the apparatus, wherein the means for receiving the allocation from the BS for the at least one symbol beam switching gap comprises:
means for detecting one or more grants from the BS;
means for determining the at least one symbol beam switching gap is not allocated in time domain resources allocated by a first grant when there is another grant that indicates the same beam is used for adjacent time domain resources after the time domain resources allocated by the first grant; and
means for determining the at least one symbol beam switching gap is allocated in the time domain resources allocated by the first grant when:
there is another grant that indicates a different beam is used for the adjacent time domain resources after the time domain resources allocated by the first grant, or
no other grant is received to allocate the time domain resources after the adjacent time domain resources allocated by the first grant; and
means for communicating with the BS using the allocation.

37. An apparatus, comprising:
means for sending an allocation to a user equipment (UE) including at least one symbol beam switching gap based, at least in part, on a subcarrier spacing (SCS) of the UE, wherein the means for sending the allocation to the UE comprises:
means for sending a first grant to the UE allocating first time domain resources using a beam and a second grant allocating adjacent second time domain resources using the same beam to indicate the at least one symbol beam switching gap is not allocated in the first time domain resources allocated by the first grant; and
means for sending the first grant to the UE allocating first time domain resources using the beam and the second grant allocating adjacent second time domain resources using a different beam to indicate the at least one symbol beam switching gap is allocated in the first time domain resources allocated by the first grant; and
means for communicating with the UE using the allocation.

38. A non-transitory computer readable medium storing computer executable code thereon which, when executed by a processor, performs an operation for wireless communications by a user equipment (UE) comprising:
receiving an allocation from a base station (BS) including at least one symbol beam switching gap based, at least in part, on a subcarrier spacing (SCS) of the UE, wherein receiving the allocation from the BS for the at least one symbol beam switching gap comprises:
detecting one or more grants from the BS;
determining the at least one symbol beam switching gap is not allocated in time domain resources allocated by a first grant when there is another grant that indicates the same beam is used for adjacent time domain resources after the time domain resources allocated by the first grant; and
determining the at least one symbol beam switching gap is allocated in the time domain resources allocated by the first grant when:
there is another grant that indicates a different beam is used for the adjacent time domain resources after the time domain resources allocated by the first grant, or
no other grant is received to allocate the time domain resources after the adjacent time domain resources allocated by the first grant; and
communicating with the BS using the allocation.

39. A non-transitory computer readable medium storing computer executable code thereon which, when executed by a processor, performs an operation for wireless communications by a base station comprising:
sending an allocation to a user equipment (UE) including at least one symbol beam switching gap based, at least in part, on a subcarrier spacing (SCS) of the UE, wherein sending the allocation to the UE comprises:
sending a first grant to the UE allocating first time domain resources using a beam and a second grant allocating adjacent second time domain resources using the same beam to indicate the at least one symbol beam switching gap is not allocated in the first time domain resources allocated by the first grant; and
sending the first grant to the UE allocating first time domain resources using the beam and the second grant allocating adjacent second time domain resources using a different beam to indicate the at least one symbol beam switching gap is allocated in the first time domain resources allocated by the first grant; and
communicating with the UE using the allocation.

* * * * *